United States Patent Office 2,994,082
Patented July 25, 1961

2,994,082
METHOD OF OVERCOMING BEARING ERRORS IN DIRECTION FINDING SYSTEMS
Fritz Steiner, also known as Friedrich Steiner, Pforzheim, Germany, assignor to International Standard Electric Corporation, New York, N.Y., a corporation of Delaware
Filed June 5, 1958, Ser. No. 740,033
Claims priority, application Germany June 6, 1957
4 Claims. (Cl. 343—116)

This invention relates to a radio direction finding system and more particularly to a Doppler type direction finding system in which bearing errors resulting from a varying transient response of the receiver will be overcome.

In direction finding systems of the phase comparison type in which the phase of the received carrier wave, which is modulated, is compared with a reference signal having a fixed phase, these errors are due to the transient response of the receiver, occurring when it is detuned. In this case it is the same whether the modulation is an amplitude modulation, which is e.g. effected by a rotating goniometer and followed by addition of an auxiliary antenna voltage, or whether it is a frequency modulation caused e.g. by scanning an antenna system containing a plurality of antennas. These errors, of course, could be restricted by using a low modulation frequency. In most cases, however, other disadvantages result from use of a low modulation frequency.

In direction finding systems operating amplitude modulation principle, the use of a low modulation frequency would have a disturbing effect upon the simultaneous reception of the speech modulation. This can only be avoided in that the modulation frequency, used to obtain bearing information, is chosen to be at least twice as high as the highest voice frequency to be transmitted. In this way a complete separation between speech and bearing information is possible. In direction finding systems of the frequency modulation type or Doppler type, however, a sufficiently high scanning frequency must be chosen in order to obtain a frequency deviation of sufficient magnitude to be capable of being discriminated with standard types of frequency discriminators.

To reduce bearing errors which are due to the transient response of the receiver: The bearing information is modulated with an auxiliary carrier wave. Since the auxiliary carrier wave itself is modulated by a low frequency, this error will remain correspondingly small. A direction finding system utilizing an amplitude modulation technique has already been described in the U.S. application Serial Number 661,758, filed May 27, 1957. This method reduces the bearing error caused by the transient response of the receiver, but in the case of a strong detuning caused by the discriminator, a 180° phase shift of the bearing information will result..

The following describes a system requiring less costs in equipment and in which the aforementioned disadvantages are entirely avoided. In an F.M. direction finding system, a direction dependent frequency modulation signal is produced by cyclic commutation of an antenna system. In an A.M. direction finding system a direction dependent amplitude modulation signal is produced by the cyclic scanning of an antenna system by means of a rotating goniometer. In each of these systems bearing information is obtained by comparing the phase of the modulating signal with the corresponding reference signal. In addition, the speech information is separated from the bearing information. The present direction finding system of this invention provides in addition to the above a pilot signal having a frequency which is closed to the modulation frequency signal and the signal indication of the phase comparison between these two signals is then compared with a fixed phase reference signal to produce an output representative of the bearing signal thus bearing errors previously resulting from a high modulation signal as well as transient responses existing in the receiver are now avoided by the use of the low modulation technique utilized in the present invention. Accordingly, the main feature of the present invention consists in producing a signal having a frequency of about 5000 c./s., which produces the bearing signal by means of a phase comparison with a fixed phase reference signal of same frequency, and a second modulation frequency signal of about 5050 c./s., which will be termed the pilot frequency. The phase of the pilot frequency signal is independent of the direction-finding data. At the output of the receiver the phase of the frequency, containing the modulation data, with the reference signal, is compared with the signal at the frequency. By selecting two signal frequencies having approximately the same value the signals will be subjected to the same transient response of the receiver system. By obtaining a phase difference between the two measured signals it is now possible to determine the bearing direction by means of a phase comparison which is independent of the exact adjustment of the mid-band receiver frequency, and the transient response of the receiver. The phase comparisons are accomplished with the aid of conventional techniques. Two audio-frequency output voltages of the receiver are beat against each other so that the resulting difference frequency will be compared with a reference signal frequency, which is obtained by a signal indicative of the difference between the two reference modulating frequencies at the input side. On the other hand, another method used to obtain the phase comparison is to feed the frequency containing the bearing signal, as well as the pilot frequency to separate phase meters, and to obtain an indication of resultant phase difference. For example, the direction-finding frequency will move a pointer-type phase meter in direction one, and the pilot frequency will move another similar type phase meter in the opposite direction. This may also be accomplished by coupling the dials of both phase meters to one another by means of a differential gear.

The modulation of the pilot frequency at the input of the receiver may be carried out in different ways, depending on whether an amplitude- or frequency-demodulating method is desired.

In the following the invention will now be described in particular by way of two examples and figures relating to an A.M. and F.M. direction-finding system respectively.

Figure 1:
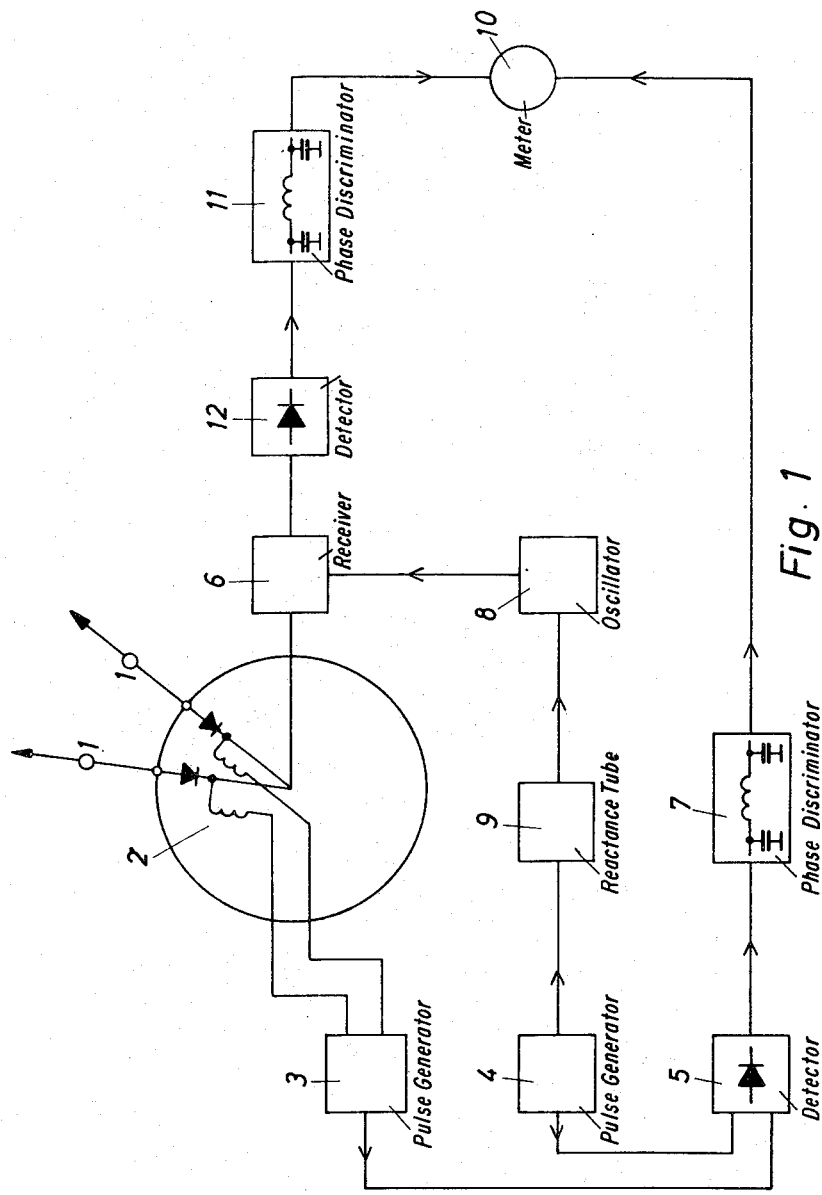
FIG. 1 is a block diagram of a direction finder system employing an F.M. technique.

In FIG. 1 of the accompanying drawing there is shown a block diagram illustrating a method of determining the direction by means of frequency modulation. In this drawing reference 1 designates a plurality of antennas consisting of 12 vertical monopoles equally spaced around the circumference of a circle, connected to a switching device 2 by means of cables. The switch may consist of 12 switching diodes which are successively engaged by a pulse generator 3 for effecting a cyclical scanning of the antennas at a scanning rate of 5000 c./s. Reference character 4 indicates a generator operating at a frequency of 5050 c./s. acting upon a reactance tube 9. By means of this reactance tube 9 one of the mixer oscillators 8 of the receiver 6 is frequency-modulated. Thus the receiving voltage, besides being modulated by the scanning frequency of 5000 c./s. (in which case the modulation with respect to the voltage from the reference signal generator 3 depends on the direction of incidence of the wave) is also frequency-modulated with a frequency of 5050 c./s. Accordingly, at the output of the converter stage of the receiver there will appear the two frequencies of 5000 c./s. and 5050 c./s. In the exemplified embodiment of FIG. 1 the difference frequency between 5000 c./s. and 5050 c./s.=50 cycles is selected by detector 12. Likewise the voltages originating from the two generators 3 and 4 are modulated with each other so that a difference frequency of 50 cycles will also be obtained. These two 50 cycle-voltages may now be compared with one another in phase meter 10. In the same way, however, it would also be possible, as already mentioned hereinbefore, to feed the two frequencies of 5000 and 5050 c./s. to separate phase meters and to subtract the indicated values from each other and then phase compare them to obtain an indication of the bearing direction.

This invention avoids errors which are dependent upon the tuning adjustment of the receiver as well as errors which are likely to be produced by the fact that the characteristic of each converter stage of the receiver has besides its middle or linear portion, two curved portions corresponding to the frequency limits of the frequency deviation band having opposite signs compared with that of the linear portion. On account of this, in the case of a detuning of the receiver beyond the linear portion of the converter characteristic there would be caused a bearing indication error of 180°. However, on account of the fact that the pilot frequency is likewise subjected to a phase shift of 180° this error will be compensated for due to the closeness in frequency of the pilot signal.

Figure 2:
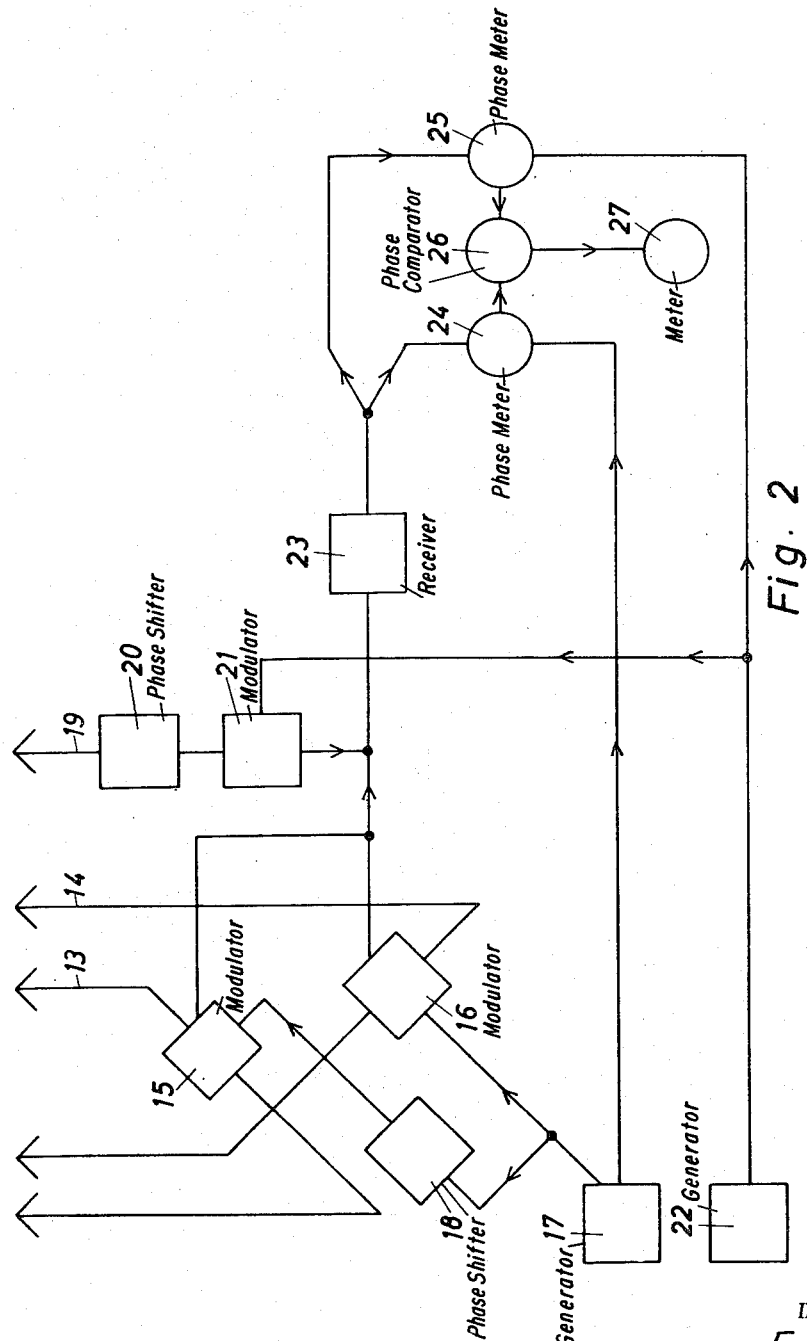
FIG. 2 is a block diagram of a direction finder system employing an A.M. technique.

In FIG. 2 there is shown an exemplified embodiment relating to a direction finding system operating on the amplitude-modulation principle. The RF voltages supplied by antenna elements 13 and 14 of an Adcock-antenna system, and which are 90° out of phase with each other are then fed to push-pull modulators 15 and 16. Generator 17 feeds two voltages out of phase by 90° with each other to modulators 15 and 16, via a conventional phase shifter 18 with a frequency of e.g. 5000 c./s. The phase shift is effected in the 90° phase network 18. Upon adding a voltage originating with the auxiliary antenna 19 and shifted via a 90° phase shifting network 20, to two voltages coming from push-pull modulators 15 and 16, an amplitude modulation of the incoming radio frequency signal will result. The phase of this modulation signal contains the bearing information.

According to the invention the voltage from auxiliary antenna 19, before being modulated with the RF-voltages is amplitude-modulated in modulator 21 from a voltage produced by generator 22 at a frequency of 5050 c./s. In this way the RF-voltage to be amplified in the receiver 23 will appear to be modulated at the same time with a frequency of 5000 c./s. and 5050 c./s. The phase of the 5050 cycles remains constant with respect to the reference signal produced from generator 22, while the phase of the 5000-cycle modulation signal, with respect to the reference signal generator 17, depends on the direction of incidence of the wave. Now the phase comparison of the signals will occur in the same manner as in FIG. 1. However, in FIG. 2 the aforementioned second embodiment for measuring the phase difference has already been shown. The two voice frequencies at the output of the receiver are applied to two phase meters 24 and 25 respectively. The reference signals from the generators 17 and 22 are also applied to the phase meters 24 and 25. Device 26 is adapted to form the difference or phase comparisons between the two indications from meters 24 and 25. Indicating device 27 will then indicate the phase difference or the bearing indication.

What is claimed is:
1. A direction finding system comprising an array of antennae uniformly spaced about the circumference of a circle, receiver means, a first means for generating a scanning frequency, means for successively applying said scanning frequency to said antennae array, means for coupling each of said antennae to said receiver means at said scanning frequency whereby the received radio field energy is effectively phase modulated at said scanning frequency, a second means for generating a reference signal at a second frequency, means for modulating said received radio field energy with said reference signal, first discriminating means for deriving a phase differential between said received signal and said reference signal, second discriminating means for deriving a phase differential between energy from said first generating means and said second generating means, and means for comparing the outputs of said first and second discriminating means to produce a bearing indication.

2. A direction finding system as in claim 1, wherein said modulating means comprise means for frequency modulating said received radio field energy with said reference signal.

3. A direction finding system as in claim 1, wherein said modulating means comprise means for amplitude modulating said received radio field energy with said reference signal.

4. A direction finding system as in claim 1, wherein said phase comparing means comprise individual phase meters connected to the output of said first and second discriminating means, and phase indicating means coupled to the output of said phase meters to produce a phase differential of the outputs of said individual phase meters.

References Cited in the file of this patent

UNITED STATES PATENTS 2,860,336    Earp et al. _____ Nov. 11, 1958